United States Patent
Le et al.

(10) Patent No.: US 8,974,002 B2
(45) Date of Patent: Mar. 10, 2015

(54) VEHICLE SEAT TUBING HAVING VARIABLE WALL THICKNESS

(71) Applicant: C&D Zodiac, Inc., Huntington Beach, CA (US)

(72) Inventors: Gary Tien Le, Covina, CA (US); Aram Aris Krikorian, Ladera Ranch, CA (US)

(73) Assignee: C&D Zodiac, Inc., Huntington Beach, CA (US)

( * ) Notice: Subject to any disclaimer, the term of this patent is extended or adjusted under 35 U.S.C. 154(b) by 0 days.

(21) Appl. No.: 13/939,247

(22) Filed: Jul. 11, 2013

(65) Prior Publication Data

US 2013/0292989 A1     Nov. 7, 2013

Related U.S. Application Data

(63) Continuation of application No. 12/753,958, filed on Apr. 5, 2010, now Pat. No. 8,506,015.

(60) Provisional application No. 61/167,563, filed on Apr. 8, 2009.

(51) Int. Cl.
    *A47C 7/02*         (2006.01)
    *B64D 11/06*      (2006.01)
    *B60N 2/68*       (2006.01)

(52) U.S. Cl.
    CPC .............. *B64D 11/0696* (2013.01); *B60N 2/68* (2013.01); *B64D 11/06* (2013.01); *B64D 2011/0655* (2013.01)
    USPC ....................................... 297/452.2; 297/248

(58) Field of Classification Search
    USPC ................... 297/216.14, 452.2, 452.18, 248; 72/370.14; 29/421.1, 897.2
    See application file for complete search history.

(56) References Cited

U.S. PATENT DOCUMENTS

| | | | | |
|---|---|---|---|---|
| 3,544,164 | A | * | 12/1970 | Ohta ........................... 297/452.2 |
| 4,616,500 | A | | 10/1986 | Alexoff |
| 5,567,017 | A | | 10/1996 | Bourgeois et al. |
| 5,988,756 | A | | 11/1999 | Aufrere et al. |
| 6,347,836 | B1 | * | 2/2002 | Hayotte ..................... 297/452.2 |
| 6,352,311 | B1 | * | 3/2002 | Hayotte ..................... 297/452.2 |
| 6,402,244 | B1 | | 6/2002 | Schonenberg et al. |
| 6,423,388 | B1 | | 7/2002 | Bateson et al. |

(Continued)

FOREIGN PATENT DOCUMENTS

| | | |
|---|---|---|
| FR | 2753935 | 4/1998 |
| WO | 2010227920 A1 | 10/2010 |

OTHER PUBLICATIONS

U.S. Manufacturing Corporation http://www/usmfg.com/Home.aspx, Copyright © 2010, 1 page.

(Continued)

*Primary Examiner* — David R Dunn
*Assistant Examiner* — Timothy J Brindley
(74) *Attorney, Agent, or Firm* — Kilpatrick Townsend & Stockton LLP; Dean W. Russell, Esq.; Tiffany L. Williams, Esq.

(57) ABSTRACT

Tubular bodies for use in frames for seats of vehicles such as aircraft are described. A tube can include a sidewall that has a variable thickness along the length of the tube. The variable thickness of the sidewalls can result in the tube having a variable inner diameter along the length of the tube. The tube may also include a variable outer diameter.

5 Claims, 4 Drawing Sheets

(56) References Cited

U.S. PATENT DOCUMENTS

| | | | |
|---|---|---|---|
| 6,615,476 B1 * | 9/2003 | Yamanaka et al. | 29/516 |
| 6,749,266 B2 * | 6/2004 | Williamson | 297/452.2 |
| 6,767,067 B2 | 7/2004 | Fourrey et al. | |
| 6,802,568 B1 | 10/2004 | Johnson | |
| 7,077,467 B2 * | 7/2006 | Wenzler | 297/188.08 |
| 7,090,309 B2 | 8/2006 | Blessing et al. | |
| 7,107,682 B2 * | 9/2006 | Hauger | 29/897.2 |
| 7,412,866 B2 * | 8/2008 | Jahani et al. | 72/370.01 |
| 7,938,485 B1 * | 5/2011 | Perciballi et al. | 297/216.1 |
| 8,393,680 B2 * | 3/2013 | Zimmermann et al. | 297/257 |
| 8,506,015 B2 | 8/2013 | Le et al. | |
| 2006/0112558 A1 | 6/2006 | Lorenz et al. | |
| 2006/0201227 A1 | 9/2006 | Lepre et al. | |
| 2007/0262635 A1 | 11/2007 | Johnson | |
| 2010/0289318 A1 | 11/2010 | Le | |

OTHER PUBLICATIONS

Reynolds Technology Ltd. T1meline, years 1841-2009, 5 pages.
Notice of Allowance dated Apr. 11, 2013 in U.S. Appl. No. 12/753,958.
Office Action dated Dec. 22, 2011 in U.S. Appl. No. 12/753,958.
Office Action dated Sep. 26, 2012 in U.S. Appl. No. 12/753,958.
Mitchell, "Variable Wall Tube Specialists", Variable Wall Draw Machine Mitchell Serial No. 2009, p. 638.
International Search Report and Written Opinion dated Jun. 16, 2010 in Application No. PCT/US2010/029893.
International Preliminary Report on Patentability dated Oct. 20, 2011 in Application No. PCT/US2010/029893.

* cited by examiner

VEHICLE SEAT TUBING HAVING VARIABLE WALL THICKNESS

CROSS-REFERENCE TO RELATED APPLICATIONS

This is a continuation of U.S. patent application Ser. No. 12/753,958, filed Apr. 5, 2010, allowed, which claims priority to U.S. Provisional Application Ser. No. 61/167,563, filed Apr. 8, 2009, and entitled "Variable Wall Thickness Tubing Principally for Aircraft Seats," the entire contents of both of which are incorporated herein by this reference.

TECHNICAL FIELD OF THE INVENTION

The present invention relates generally to tubing for seats of a vehicle such as an aircraft and, more particularly to seat tubing having a variable wall thickness.

BACKGROUND

Seats in vehicles such as aircraft include frames for supporting cushions, pads, and other seating components. A frame can include one or more base-frame tubes capable of providing support when the seat experiences stresses caused by an individual in the seat during a crash landing condition or caused by other activities. A base-frame tube includes a main tube and a second tube located in the inner diameter of the main tube. The second tube can provide local reinforcement to the main tube. The main tube and the second tube are fastened together using rivets. The base-frame tube has a constant outer diameter.

Each of the main tube and the second tube has sidewalls of consistent thickness. The tubes are often made from extruded or drawn metal, such as aluminum or steel. When loads are placed on the tubes, the second tube can change position in the inner diameter of the main tube and cause uneven distribution of forces from stress at the abrupt transitions in overall tube sidewall thickness. Furthermore, such tube configurations can be relatively heavy.

Accordingly, tubes are desirable that can distribute loads more evenly. Tubes are also desirable that weigh less and that can require less assembly time. Tubes are also desirable that are configured to prevent the tubes from decoupling from additional components of frames.

SUMMARY

In one aspect, a frame for an aircraft seat is described. The frame includes a wall of a tubular body. The wall includes a first portion that has a first wall thickness and a second portion that has a second wall thickness that is greater than the first wall thickness. The first portion defines an inner diameter that is greater than an inner diameter defined by the second portion.

In at least one embodiment, the wall of the tubular body includes a third portion that has an outer diameter that is greater than an outer diameter of at least one of the first portion or the second portion.

In at least one embodiment, the third portion is the same thickness as the second wall thickness.

In at least one embodiment, the third portion defines an inner diameter that is smaller than the inner diameter of the second portion.

In at least one embodiment, the tubular body is made from at least one of aluminum or steel.

In at least one embodiment, the tubular body is made from a cold form drawing process.

In another aspect, a tubular body is described. The tubular body includes a first portion and a second portion. The first portion has a first wall thickness. The second portion has a second wall thickness that is greater than the first wall thickness. The first portion defines an inner diameter that is greater than an inner diameter defined by the second portion. The tubular body is a component of a frame for a seat capable of being disposed in a vehicle.

In at least one embodiment, the tubular body also includes a third portion that has an outer diameter that is greater than an outer diameter of at least one of the first portion or the second portion.

In at least one embodiment, the third portion is capable of preventing the tubular body from decoupling from another component of the frame.

In at least one embodiment, the vehicle is an aircraft.

In another aspect, a seat for an aircraft includes a frame that has a tubular body. The tubular body includes three portions. The first portion has a first wall thickness. The second portion has a second wall thickness that is greater than the first wall thickness. The first portion defines an inner diameter that is greater than an inner diameter defined by the second portion. The third portion has an outer diameter that is greater than an outer diameter of at least one of the first portion or the second portion.

These illustrative aspects and embodiments are mentioned not to limit or define the invention, but to provide examples to aid understanding of the inventive concepts disclosed in this application. Other aspects, advantages, and features of the present invention will become apparent after review of the entire application.

DETAILED DESCRIPTION

Certain aspects and embodiments of the present invention are directed to tubular bodies for use in frames for seats of vehicles such as aircraft. A tube according to some embodiments includes a sidewall that has a variable thickness along the length of the tube. The variable thickness of the sidewalls can result in the tube having a variable inner diameter along the length of the tube. The variable thickness can distribute loads from stress more evenly than traditional tubes. Furthermore, a tube may not require that a second tube be inserted in an inner diameter and coupled, reducing assembly time and decreasing the weight of the tube. A tube according to various embodiments of the present invention can be made from any suitable material. Examples of suitable material include metal and composite material.

In some embodiments, a tube has a variable outer diameter along the length of the tube. The variable outer diameter can prevent the tubular body from decoupling from another component of the frame. The frame can provide support for a seat of a vehicle such as an aircraft.

Figure 1:
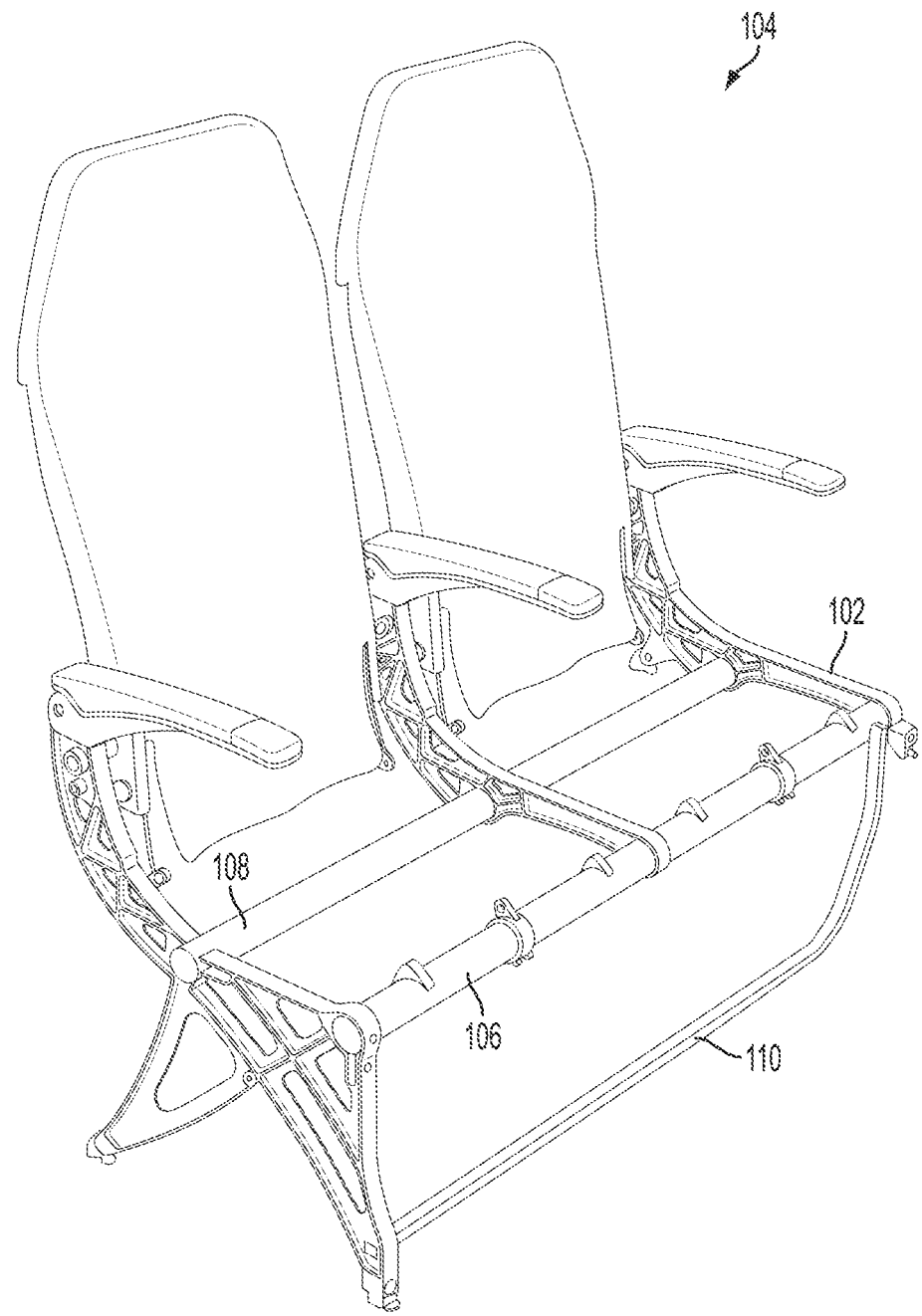
FIG. 1 is a perspective view of a frame of a seat for a vehicle that, such as an aircraft, that includes a tubular body according to one embodiment of the present invention.

FIG. 1 depicts a frame 102 of an aircraft seat 104 according to one embodiment. The frame 102 includes various coupled components that provide support for the seat 104. The components of the frame 102 in FIG. 1 include two tubular bodies 106, 108. Frames according to embodiments of the invention can include any number of tubular bodies. The seat 104 in FIG. 1 can be completed by attaching cushions (not shown) to the tubular bodies 106, 108 and positioned a bottom pan (not shown) between the tubular bodies 106, 108 and a bottom frame component 110, which may also be a tubular body. In some embodiments, the bottom frame component 110 is a baggage bar. Any of tubular bodies 106, 108 or bottom frame component 110 may be a tube according to certain embodiments of the present invention. For example, tubular body 106 can include a variable wall thickness and can include a variable outer diameter. The tubular body 106 can be made from any suitable material. Examples of suitable materials include aluminum and steel.

Figure 2:
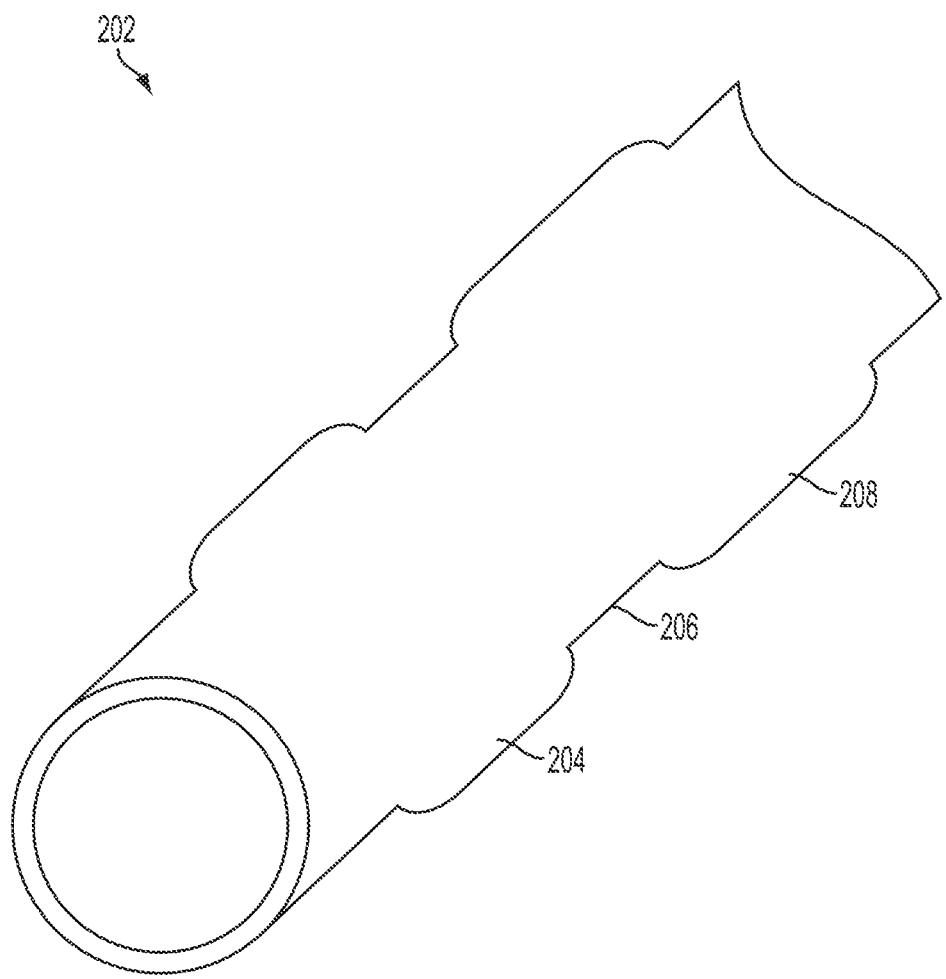
FIG. 2 is a perspective view of a tubular body according to one embodiment of the present invention.

FIG. 2 depicts a perspective view of a tubular body 202 that includes a variable outer diameter. The tubular body 202 has one portion 204 with an outer diameter that is larger than the outer diameter of a second portion 206. The tubular body 202 also includes a third portion 208 with an outer diameter that is larger than the outer diameter of the second portion 206. In some embodiments, the outer diameter of the third portion 208 is the same as the outer diameter of the portion 204. The large outer diameter portions can increase the strength of the tube, increase the weight of the tube, make the frame stiffer, and transfer loads directly to the frame. The variable wall thickness of the tubular body 202 can reinforce portions of the tubular body 202 that experiences higher stress, such as by distributing the load and absorb and dissipate energy. In some embodiments, the large outer diameter portions can prevent seat structures, such as legs or spreaders, from slipping out of the tubular body 202 during dynamic crash loading, or otherwise.

In other embodiments, a tubular body has a constant outer diameter so that is and/or a leg or other frame component can be installed at any location.

Figure 3:
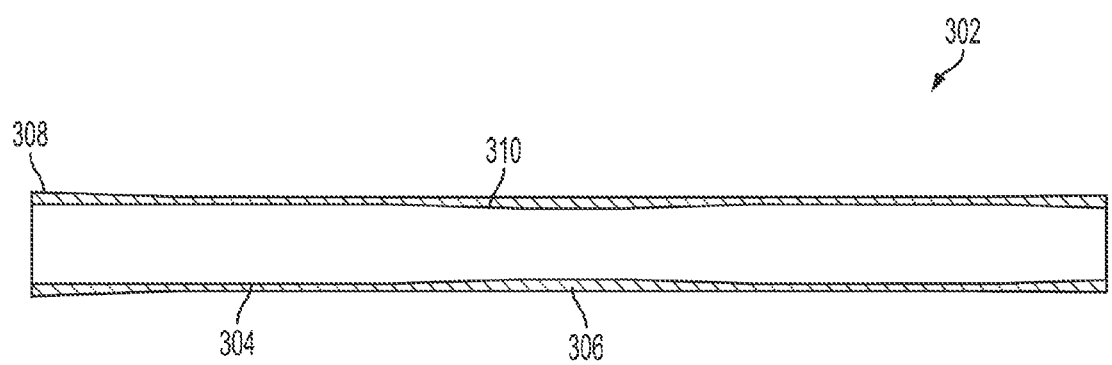
FIG. 3 is a cross-sectional view of a tubular body according to one embodiment of the present invention.

Tubular bodies according to some embodiments of the present invention can also include a variable inner diameter and/or a variable sidewall thickness. FIG. 3 depicts a cross-section of a tubular body 302 according to one embodiment. The tubular body 302 may be a single piece of tubing that has a first portion 304 with an inner diameter that is greater than an inner diameter of a second portion 306. The first portion 304 may also include a sidewall that has a thickness that is less than the thickness of the sidewall at the second portion 306. Variable sidewall thickness can be created using any suitable process, such as a cold form drawing technique. U.S. Pat. No. 4,615,500 to Alexoff and U.S. Patent Pub. No. 2006/0112558 to Lorenz, et al. describe examples of suitable processes of making variable wall thickness tubing.

The tubular body 302 can include any number of varied outer diameters, wall thicknesses (including constant thickness lengths and tapering thickness lengths). FIG. 3 depicts tubular body 302 as also including a portion 308 having a greater outer diameter than other portions of the tubular body 302. Tubular bodies according to other embodiments, however, include a variable sidewall thickness and/or varying inner diameters, but do not include a varying outer diameter.

The tubular body 302 can be constructed to avoid abrupt transitions in inner diameter variation. For example, the tubular body 302 can transition from the inner diameter of the first portion 304 to the lesser inner diameter of the second portion 306 via transition portion 310 that has an inner diameter that decreases from the first portion 304 to the second portion 306.

Figure 4A:
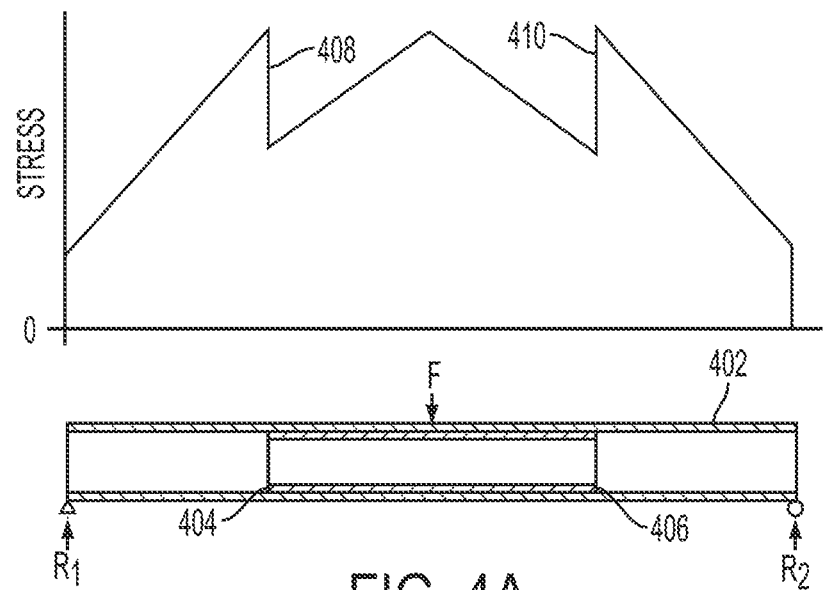
FIG. 4A depicts a load distribution of a prior art tube.
Figure 4B:
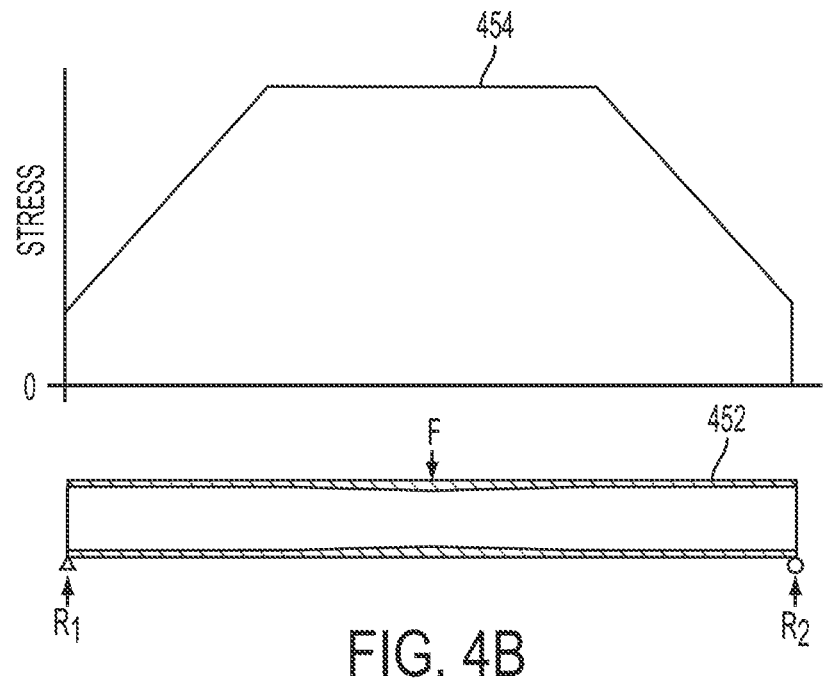
FIG. 4B depicts a load distribution of a tubular body according to one embodiment of the present invention.

A tubular body according to some embodiments of the present invention can alleviate tube stress more evenly as compared to traditional tubes. FIGS. 4A and 4B include graphs that depict stress along portions of a traditional tube 402 in FIG. 4A and a tubular body 452 according to one embodiment of the present invention. The traditional tube 402 introduces abrupt transitions 404, 406 in tube thickness resulting in uneven stresses 408, 410 along the tube length. The tubular body 452 can yield a constant stress 454 along the tube length. Furthermore, the tubular body 452 can be easier to assemble and can provide lighter weight construction as compared to traditional tube 402.

The foregoing description of the embodiments, including illustrated embodiments, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A frame, comprising:
    a bottom component of a vehicle seat, wherein the bottom component is a tube having a variable outer diameter and is coupled to a base component configured for coupling to a vehicle, the bottom component including:
        a first end portion having a first outer wall thickness;
        a second end portion having a second outer wall thickness; and
        a middle portion between the first end portion and the second end portion, the middle portion having a third outer wall thickness that is less than the first outer wall thickness and the second outer wall thickness, the first end portion having a greater outer diameter than the second end portion;
        wherein the first end portion has a greater outer diameter than the middle portion.

2. The frame of claim 1, wherein the bottom component defines an inner area that does not include a second component therein.

3. The frame of claim 1, wherein the bottom component is made from aluminum.

4. The frame of claim 1, wherein the bottom component is a baggage bar of the vehicle seat that is an aircraft seat.

5. The frame of claim 1, further comprising tubular bodies attachable to a seat cushion, at least part of the bottom component being located on a different plane than the tubular bodies.

* * * * *